Dec. 3, 1957 C. PASSAGGIO 2,815,042
TIME DELAY VALVE
Filed Aug. 31, 1956

INVENTOR
CHARLES PASSAGGIO.
BY
Churchill, Rich, Waymouth & Kugel
ATTORNEYS.

United States Patent Office 2,815,042
Patented Dec. 3, 1957

2,815,042

TIME DELAY VALVE

Charles Passaggio, Flushing, N. Y., assignor to Scovill Manufacturing Company, Waterbury, Conn., a corporation of Connecticut Application August 31, 1956, Serial No. 607,445

6 Claims. (Cl. 137—620)

The present invention relates to a pilot valve and timer which is operative by a momentary air impulse to start a time cycle lasting from a fraction of a second to minutes, during which a fluid may flow through the valve to perform a given function. In such time cycle the time interval between the momentary air impulse and the commencement of the given function, as well as the duration of the function, can be controlled. The valve can be used to meter a certain amount of fluid such as air, water, oil, etc.; to time a cylinder cycle and discharge the fluid back through the valve when released; to time the beginning and end of an air blast and numerous other functions.

In its underlying concept the invention consists of a housing in which a pilot valve and timer are confined, the operation of the pilot valve being controlled by an air blast acting on one side of a differential piston assembly which, in turn, moves in response to the flow of air from the blast to the opposite side of the piston through a needle valve and after pressure build-up, to the atmosphere through a second needle valve for timing the opening and duration of operation of the pilot valve. The invention will be better understood from the detailed description which follows, when considered in connection with the accompanying drawings showing a preferred embodiment, and wherein:

Figure 1:
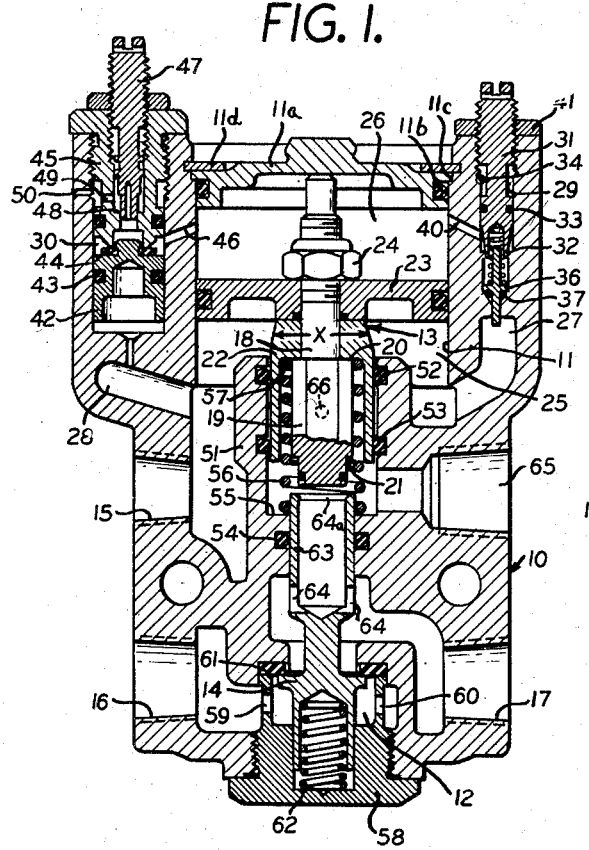
Figure 1 is a diametrical section through a pilot valve and timer embodying the invention.

Referring to the drawings, wherein the invention is shown as applied to a 3-way valve, the device may be said to comprise a housing 10 having formed therein a piston chamber 11, a pilot valve chamber 12, there being a differential piston assembly 13 movable in the chamber 11, and a pilot valve 14 movable in the chamber 12. The housing is also formed with a port 15 leading to the piston chamber 11 and with an inlet port 16 and an outlet port 17 leading into and from the pilot valve chamber 12. The housing 10 is also formed with various ducts, ports and supplemental valves, all of which will be presently described.

The piston chamber 11 is closed at its outer end by a cap 11a provided with an O-ring packing 11b and held in place on a shoulder 11c by a split spring ring 11d. The differential piston assembly 13 consists of a piston rod 18 having an enlarged portion 19 providing shoulders 20 and 21 thereon, there being a sleeve 22 engaging the shoulder 20 and a piston 23 engaging the outer end of the sleeve and held thereto and onto the piston rod by a lock nut 24. The piston 23 divides the piston chamber 11 into a first sub-chamber 25 and a second sub-chamber 26, the effective area of the piston 23 exposed to the second sub-chamber being greater than the effective area of said piston exposed to said first sub-chamber.

Figure 4:
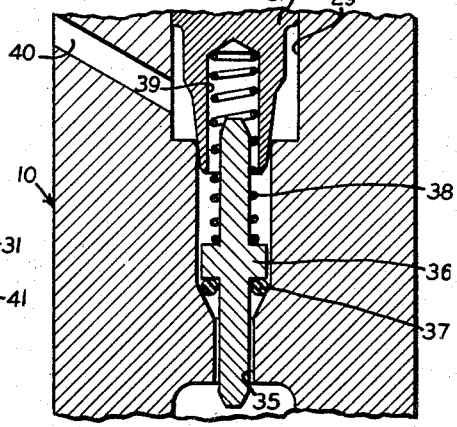
Fig. 4 is an enlarged section of a spring-loaded check valve used in the device embodying the invention.

Leading from the first sub-chamber 25 are a pair of passages 27 and 28, the passage 27 leading to a first needle valve chamber 29 and the passage 28 leading to a second needle valve chamber 30. Mounted in the needle valve chamber 29 is a screwed-threaded needle valve 31 which is adjustable toward and away from a valve seat 32, the valve being fitted with an O-ring 33 to provide a slidable seal with the wall of the chamber 29 and the valve 31 having an intermediate reduced shank portion through which a pin 34 extends to limit the axial movement of the valve. The valve chamber 29 connects with the passage 27 by a duct 35 (Fig. 4) and normally sealing said duct is a spring-loaded check valve 36 which comprises an O-ring 37 and a loading spring 38, a part of said spring and a portion of the stem of said valve being guided within a socket 39 formed at the inner end of the needle valve 31. A duct 40 connects the needle valve chamber 29 above the valve seat 32 with the second sub-chamber 26. The needle valve 31 may be adjusted toward and away from its seat 32 and held in such adjusted position by a lock nut 41.

Mounted within the second needle valve chamber 30 is a slidable plug valve 42 provided with an O-ring 43 and carried by the top of said plug is a washer 44. Screw-threadedly mounted into the outer end of the chamber 30 is a fixed hollow member 45 having at its inner end a valve seat for engaging and limiting the upward movement of the plug valve 42. Below the member 45 a duct 46 connects the second needle valve chamber 30 with the second sub-chamber 26. Adjustably screw-threaded into hollow member 45 is a needle valve 47 adapted for adjustment toward and away from a valve seat 48 formed in said hollow member 45, which latter has a passage 49 establishing communication between the interior of the hollow member 45 around the needle valve 47 with the chamber 30 and leading from the chamber 30 in proximity to the passage 49 is a vent opening 50.

The housing 10 between the piston 23 and the pilot valve chamber 12 is formed with a central hollow sub-housing 51 formed with longitudinally spaced, internal annular grooves 52, 53 and 54, in each of which is disposed an O-ring having a normal internal diameter smaller than the internal diameter of the sub-housing so as to make a fluid-tight seal with elements adapted to slidably engage within the sub-housing. The sub-housing 51 is formed with an internal shoulder 55 upon which rests one end of a coil-spring 56, the opposite end of which bears against an internal shoulder 57 within the sleeve 22, the said spring normally biasing the differential piston assembly 13 outwardly to the limit of its movement.

The pilot valve chamber 12 is closed at its bottom by a hollow plug 58 which is screw-threadedly mounted in the housing 10, the said plug having ports 59 and 60 therethrough in open communication with the valve chamber 12 and the inner end of said plug serving to hold a washer or valve seat 61 in place.

The pilot valve 14 is held against the valve seat 61 by a coil-spring 62 and the pilot valve also has a hollow stem portion 63 formed with ports 64 and 64a so disposed therein that when the pilot valve is seated, the ports 64 and 64a will communicate with the outlet port 17 and with a relief port 65 formed in the housing 10.

Between the O-rings within the grooves 52 and 53 the sub-housing 51 and housing 10 is formed with a vent passage 66 leading to atmosphere.

In the use of the valve for controlling a timing cycle each of the needle valves 29 and 30 will be slightly unseated, the port 15 will be connected with a source of air under pressure, the port 16 will be connected with a source of fluid supply, the port 17 will be connected to a machine or device which is to be operated upon by the fluid passing through the pilot valve 14 and the port 65 will be connected to dump, or release fluid after it has passed through the pilot valve and has performed its useful work.

A blast of compressed air is introduced into the first sub-chamber 25, whereupon the following occurs: (*a*) plug valve 42 moves under the force of air passing through duct 28 and seats said valve against the seat on the hollow member 45 and thus also seals the through passages 46, 49 and 50 from the second sub-chamber 26 to the atmosphere, which passages are ordinarily open when the plug valve 42 is unseated; (*b*) the air admitted into the first sub-chamber 25 enters passage 27 and unseats the spring-loaded check valve 36 and thereupon passes through the open needle valve 31 into the second sub-chamber 26 where the air pressure builds up and reduces the pressure in the first sub-chamber 25.

Figure 3:
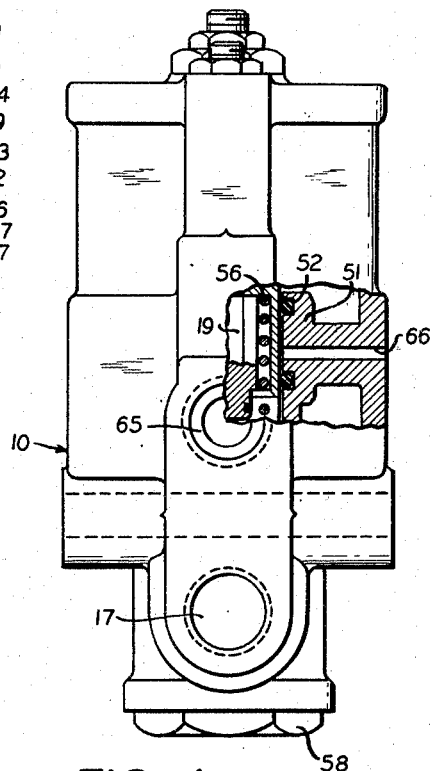
Fig. 3 is a side elevational view of the device with parts broken away to show a detail of construction.
Figure 2:
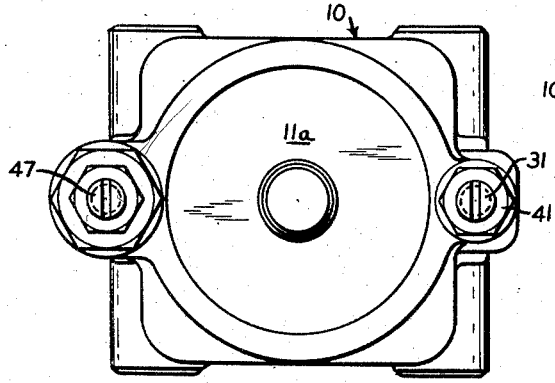
Fig. 2 is a top plan view of the device shown in Fig. 1.

When sufficient pressure build-up has taken place in second sub-chamber 26, the increased effective area of the differential piston 23 exposed to sub-chamber 26 causes the piston assembly 13 to move slowly downward until a reduced diameter of the assembly indicated at *x* passes the O-ring seal in the annular groove 52. When this occurs, the first sub-chamber 25 is opened to atmosphere through the vent port 66 (Fig. 3) through which the air is dumped causing an accelerated motion of the piston assembly downward. The piston assembly, and more specifically the shoulder 21 on the piston rod 18, engages and moves the inner end of the hollow stem 63 against the force of the spring 62 to open the pilot valve 14 and allow the supply fluid to pass from inlet port 16 to outlet port 17 and perform its intended function. The pressure in the first sub-chamber having been reduced to atmospheric, the valve 36 will close due to the pressure in sub-chamber 26. Simultaneously, the air entering the chamber 30 through the duct 46 will unseat the plug valve 42 and permit air from the second sub-chamber 26 to escape to atmosphere through the open needle valve 47, passage 49 and vent 50. As the air pressure in the second sub-chamber 26 is reduced, the spring 56 will move the piston assembly upwardly thereby permitting the pilot valve 14 to close under the force of spring 62 and open communication from port 17 through the hollow stem 63 to port 65 to dump the fluid after having performed its function.

By adjusting the needle valve 31 the response time before the pilot valve 14 will open may be varied from a fraction of a second to minutes.

Independently, by adjusting the needle valve 47, the time interval during which the pilot valve can be kept open may be varied from a fraction of a second to minutes.

It will thus be seen that by carefully adjusting the needle valves 31 and 47 the time intervals between the momentary application of the air charge to the first sub-chamber and the commencement of the given function, as well as the duration of the function, can be accurately controlled.

While I have shown and described a preferred embodiment of the invention it will be understood that changes in constructional details and relationship of parts may be resorted to within the range of engineering and mechanical skill without departing from the spirit of the invention as hereinafter claimed.

What I claim is:

1. A combined pilot valve and timer comprising a housing having therein a piston chamber and a pilot valve chamber having an inlet and an outlet port, a differential piston assembly movably mounted in and dividing said piston chamber into a first and a second sub-chamber, spring means biasing the piston to a limiting position in the second sub-chamber, the effective area of the piston in the second sub-chamber being larger than the effective area of the piston in the first sub-chamber, a port for admitting a blast of air to the first sub-chamber, a first duct for establishing air communication between said sub-chambers, a normally seated valve in said first duct adapted to be unseated by the air pressure admitted into the first sub-chamber and permit air pressure to build up in said second sub-chamber to move the piston against the force of the spring means, a second duct having ports communicating respectively with the first and second sub-chambers and with the atmosphere, two valves in said second duct, a first of said valves being capable of sealing off communication between the ports and the second of said valves being an adjustable needle valve controlling the flow of air through said second duct from said second sub-chamber to the atmosphere when said first valve is open, a spring-seated pilot valve in the pilot valve chamber unseatable by the piston assembly when moved by built-up air pressure in the second sub-chamber, a vent port leading from the first sub-chamber to atmosphere and means on the piston assembly normally closing said port but adapted to uncover said port when the pilot valve is held open by the piston assembly.

2. The combination according to claim 1, wherein the first of said valves in said second duct comprises a fixed seat and a movable plug engageable with said seat and at all times seals off communication between the ports leading to said first and second sub-chambers.

3. The combination according to claim 1, wherein, in addition to the normally seated valve in the first duct, there is an adjustable needle valve for controlling the rate of flow of air from the first sub-chamber to the second sub-chamber.

4. The combination according to claim 3, wherein the pilot valve is a three-way valve and the pilot chamber has an exhaust port, and the piston assembly is adapted to seal the passage between the inlet port and exhaust port and between the outlet port and the exhaust port when the valve is unseated, and open the passage between the outlet port and the exhaust port when the valve is seated.

5. The combination according to claim 3, wherein adjustment of the needle valve in the first duct varies the time interval of the opening of the pilot valve after admitting a blast of air to said first sub-chamber.

6. The combination according to claim 3, wherein the adjustment of the needle valve in the second duct varies the time interval during which the pilot valve will remain open.

References Cited in the file of this patent
UNITED STATES PATENTS

| | | |
|---|---|---|
| 1,194,346 | Akans | Aug. 15, 1916 |
| 2,013,665 | Messier | Sept. 10, 1935 |